United States Patent [19]

Askew et al.

[11] Patent Number: 5,226,956
[45] Date of Patent: Jul. 13, 1993

[54] SURFACE COATING COMPOSITIONS

[75] Inventors: Herbert F. Askew, Weston Turville; Anthony R. Emery, Cross; John H. W. Turner, Chapelen-le-Frith, all of England

[73] Assignee: Alcan International, Inc., Montreal, Canada

[21] Appl. No.: 754,348

[22] Filed: Sep. 5, 1991

Related U.S. Application Data

[63] Continuation of Ser. No. 449,068, Dec. 14, 1989, abandoned, which is a continuation of Ser. No. 172,053, Mar. 23, 1988, abandoned.

[30] Foreign Application Priority Data

Mar. 24, 1987 [GB] United Kingdom ............... 8706915

[51] Int. Cl.$^5$ ............................................. C09D 5/08
[52] U.S. Cl. ............................... 106/14.05; 106/143.7; 106/14.42; 252/388; 252/390; 252/392; 252/394; 252/396
[58] Field of Search ............... 106/14.05, 14.15, 14.16, 106/14.37, 14.42, 14.41; 252/388, 390, 394, 392, 396

[56] References Cited

U.S. PATENT DOCUMENTS

| | | | |
|---|---|---|---|
| Re. 29,170 | 4/1977 | Burke | 106/27 |
| 2,333,206 | 5/1939 | Sloan | 106/14.05 |
| 2,596,450 | 5/1952 | Wachter et al. | 106/14.37 |
| 3,288,555 | 11/1966 | Napier et al. | 106/14.05 |
| 3,320,082 | 5/1967 | McMahon et al. | 106/14.15 |
| 4,154,618 | 5/1979 | Burke | 106/30 |
| 4,179,536 | 12/1979 | Kasamatsu et al. | 106/15.05 |
| 4,226,624 | 10/1980 | Ohr | 106/14.05 |
| 4,307,000 | 12/1981 | Vasta | 106/264 |
| 4,326,987 | 4/1982 | Hendricks et al. | 106/14.37 |
| 4,357,181 | 11/1982 | Frank et al. | 148/274 |
| 4,466,840 | 8/1984 | Frank et al. | 106/14.05 |
| 4,501,615 | 2/1985 | Reeder et al. | 106/14.39 |
| 4,505,748 | 3/1955 | Baxter | 106/14.39 |
| 4,529,487 | 7/1985 | Hsu et al. | 205/196 |
| 4,622,072 | 11/1986 | Turner | 106/264 |
| 4,631,087 | 12/1986 | Turner | 106/264 |
| 4,784,796 | 11/1988 | Treybig et al. | 106/14.16 |

FOREIGN PATENT DOCUMENTS

| | | |
|---|---|---|
| 125025 | 11/1984 | European Pat. Off. |
| 1941328 | 3/1971 | Fed. Rep. of Germany |
| 56-155256 | 12/1981 | Japan |
| 105733 | 12/1954 | New Zealand |
| 104533 | 11/1955 | New Zealand |
| 186137 | 11/1978 | New Zealand |
| 204410 | 8/1985 | New Zealand |
| 640729 | 7/1950 | United Kingdom |
| 1121124 | 7/1968 | United Kingdom |
| 1133325 | 11/1968 | United Kingdom |
| 1141355 | 1/1969 | United Kingdom |
| 1184562 | 3/1970 | United Kingdom |
| 1190073 | 4/1970 | United Kingdom |
| 1226100 | 3/1971 | United Kingdom |
| 1249144 | 10/1971 | United Kingdom |
| 1336352 | 11/1973 | United Kingdom |
| 2019428B | 10/1979 | United Kingdom |
| 2131822B | 6/1984 | United Kingdom |

OTHER PUBLICATIONS

Hawley's Condensed Chemical Dictionary, Eleventh Edition, Van Nostrand, New York p. 921.
Dangerous Properties of Industrial Materials, 7th Edition, von Nostrand, New York, pp. 1185 and 2543.
Maass, "Corrosion Inhibitors", Modern Paint and Coatings, Aug. 1983, pp. 31-39.

Primary Examiner—Mark L. Bell
Assistant Examiner—Anthony J. Green
Attorney, Agent, or Firm—Lowe, Price, LeBlanc & Becker

[57] ABSTRACT

A paint or varnish composition is described which comprises a medium, such as an alkyd resin, and an anticorrosion agent which is environmentally non-hazardous and soluble or adapted to be soluble in the medium. The composition is suitable for application to a metal substrate and the anticorrosion agent is selected so as to enable a dry paint or varnish film to be obtained on the metal substrate, preferably within 24 hours from the time of application.

10 Claims, No Drawings

SURFACE COATING COMPOSITIONS

This application is a continuation of application Ser. No. 07/449,068 filed Dec. 14, 1989, abandoned, which is a combination of application Ser. No. 07/182,053 filed Mar. 23, 1988, abandoned.

This invention relates to surface coating compositions and more specifically to paints and varnishes comprising an anticorrosion additive.

The present invention relates to surface coating compositions such as paints and varnishes which are to be applied to metal substrates such as iron, steel, copper, aluminum, zinc and magnesium.

It is known to introduce anticorrosive pigments into paint compositions. Conventional anticorrosive pigments are inorganic compounds which are insoluble in the paint composition. It is generally assumed in the industry that, in the presence of water, these anticorrosive pigments are slowly release soluble ions and inhibit corrosion. Examples of anticorrosive pigments include lead based systems, such as red lead, and chromates such as zinc chromate. Although some of these anticorrosive pigments are still used industrially there is strong pressure on the paint industry to discontinue their use because of their environmental hazard.

There is therefore a need in the industry for a useful non-toxic anticorrosion agent which can be incorporated into surface coating compositions such as paints.

The present invention provides a paint or varnish composition comprising a medium and an environmentally non-hazardous anticorrosion agent which is soluble or adapted to be soluble in the medium and which is selected so as to enable a dry paint or varnish film to be obtained on a metal substrate to which the composition is to be applied.

The anticorrosion agent used in the paint or varnish according to the present invention is selected so as to have a balance between the desired specificity to the metal substrate to which it is to be applied and the undesired specificity to other components of the composition such as a drier The anticorrosion agent is one which enables a dry paint, or varnish film to be obtained on a metal substrate to which the composition is to be applied, within 24 hours, preferably within 12 hours, from the time of application, drying being determined according to British Standard (BS) 3900 Part C(2).

It has been proposed (EP 0125025) to use benzaldoximes to inhibit the corrosion of metals. It is postulated that the benzaldoximes function as corrosion inhibitors by chelating with the metal of the substrate to which the inhibitor is applied and forming a protective complex. The formation of the protective complex takes place in preference to the rusting process. Compounds or complexes which are strong chelating agents, such as the benzaldoximes of EP 0125025, are outside the scope of the anticorrosion agents employed in the present invention since strong chelating agents could chelate, for example, to a drier, and would thereby prevent adequate drying.

Environmentally harmful compounds such as barium salts and chromium salts are also excluded from the scope of the anticorrosion agents employed in the present invention.

The surface coating composition according to the present invention is a paint or varnish suitable for application to a metal substrate.

The term "paint" as used herein includes within its scope primers and undercoats and the like as well as thick coatings which are conventionally applied, for example, to oil rigs.

According to this invention the anti-corrosion composition may be applied directly to the metal substrate without the need for any pretreatment of the substrate. The surface coating composition of this invention is however, a paint or varnish and is not in itself intended for use in a pre-treatment process, such as that disclosed in DE-A-1941328.

The anticorrosion additives used in the compositions according to the present invention may be compounds or complexes which are soluble per se in the medium components of the composition. Alternatively the anticorrosion additive is a compound or complex which is solubilized by one of various techniques. For example:

a) the additive may be modified so as to add suitable solubilising moieties such as an ester group, a glycol, an alkoxy group, an aromatic group or a long chain aliphatic group; or b) the additive may be solubilized by prior reaction with one of the components of the surface coating composition, for example with a drier; or c) the additive may be pre-reacted with the medium itself and generally such reaction will involve hydroxy, epoxy, carboxyl or unsaturated groups in the resin.

These reactions a), b) and c) must be controlled so as not adversely to affect the physical and chemical properties of the system.

Examples of anticorrosion additives which are soluble per se include tetraethylene pentamine, triethylene tetramine and 1,8-diamino octane.

Anticorrosion agents which have been modified by addition of a suitable solubilising moiety include phenoxyacetic acid and tertiary butylaniline where the phenoxy and tertiary butyl and groups respectively are the solubilising moieties.

The choice of particular anticorrosion additive employed will be governed inter alia by the substrate to which the surface coating composition is to be applied.

- Suitable anticorrosion agents include acids, for example, carboxylic or aromatic acids which may be monobasic or polybasic, unsubstituted or substituted; boron acids; inorganic acids; salts possibly overbased, or esters or partial esters of the above acids; simple or complex amines including polyamines and aminoalcohols; organosulphur compounds; organonitrogen compounds including organic derivatives of various nitrogen acids, optionally thio-substituted; organophosphorus compounds; heterocyclic compounds such as those containing one or more of nitrogen, sulphur, phosphorus or boron atoms.

The medium component of the surface coating composition according to the present invention may be, for example, a drying or semi-drying oil (which may optionally be polymerised), an alkyd resin, a hydrocarbon resin, a phenolic resin, an amino resin, a vinyl resin, an acrylic resin, an epoxy resin, a saturated or oil free polyester resin, a polyamide resin or a polyurethane resin or a chlorinated rubber. The resins may optionally be modified.

According to a particular embodiment of the invention the surface coating composition contains a drier. The drier which is optionally incorporated in the compositions according to the present invention may be any conventional drier such as the metal-containing organic compounds or compositions, for example of cobalt, manganese, calcium, barium or lead, or of rare earth metals such as cerium, often combined with suitable carboxylic acids to ensure their compatibility with the paint medium. Zirconium and aluminum compounds are also known to be paint driers and can be included in the surface coating compositions of the present invention.

According to a particular embodiment of this invention the drier comprises an aluminum compound such as an aluminum, alkoxide or substituted aluminum alkoxide, or an oxoaluminium compound containing organic substituents. The use of an aluminum drier has the advantage that the applied surface coating film may have reduced water-permeability and it is postulated that this assists the prevention of corrosion by reducing the amount of water present at the surface of the metal substrate.

The surface coating composition containing the aluminum drier may be stabilised against premature thickening using a base selected from ammonia, aqueous ammonia, an alkylamine, an alkanolamine and other compounds which by dissociation or hydrolysis release ammonia or an amine. Water may optionally be employed as a secondary stabilizer. The aluminum compound or complex itself may also be stabilised with an amine base and optionally water.

The amount of amine base required depends inter alia on the equivalent weight of the base, the reactivity of the paint medium, the composition of the aluminum component and the amount of water optionally used to moderate the reactivity of the aluminum compound. A typical content of base would be in the range of 0.1–5% by weight of the non-volatile content of the medium to which the aluminum composition is added.

The anticorrosion additives which have been found to contribute beneficially to the performance of the paints containing the optionally stabilised aluminum compounds when applied to metal substrates are compatible with the paint medium and with the aluminum compounds before or after their addition to the paint medium and have been solubilized by any of the methods mentioned previously in particular by pre-reaction with the aluminum drier.

The following non-exhaustive list of suitable anticorrosion additives is given by way of example for three different substrates:

a) for iron/steel oleic, succinic and boric acids and salts and esters thereof; high molecular weight amines and polyamines; aminoalcohols; esters especially half esters and partially esterified polyhydric alcohols; morpholine and derivatives; nitrobenzoic acid and amine esters of phosphoric acid;
b) for copper amines; thiadiazoles; thiazoles, azoles; sulphides; thiocarbamates; and acid anhydrides;
c) for aluminum amines; and organic acids;
d) for magnesium amines, organic acids or anhydrides.

In some cases it may be desirable to regulate the acidity of the system by adding for example amines, soluble overbased metallic soaps or soluble metallic carboxylates.

The anticorrosion additive may be present in the composition up to 10% by weight based on medium solids, preferably up to 5%, most preferably 0.2 to 5% by weight. The aluminum drier if used is presumed to act as a through drier and will be present at suitable levels to promote adequate drying in the presence of the anticorrosion additive and in conjunction with a surface drier if necessary. Such levels may be up to about 5% by weight, preferably up to 3% by weight, most preferably 0.1 to 0.8% by weight, elemental Al based on medium solids. If the drier and anticorrosion additive are combined then there may be an excess of one or other component depending on the reactivity of the medium, such as resin, and the degree of corrosion protection required.

The paint base consisting of a pigment, medium and a suitable diluent may be prepared by ball milling or other method appropriate for paint preparation. The anticorrosion additive together with the optionally incorporated surface drier, and other optionally incorporated additives may be added to the milled mixture and thoroughly admixed.

Conventional components of paints and varnishes such as driers, auxiliary driers, pigments, fillers and anti-skinning agents may be included in the paint or varnish composition according to the present invention. Such components will be incorporated in amounts conventionally employed.

The invention is further illustrated by the following examples wherein "parts" refers to "parts by weight".

EXAMPLE 1

An unpigmented coating was prepared based on Synolac 77W (Proprietary product (see separate list)) alkyd resin as medium. The resin was diluted to 2 poise viscosity using an appropriate solvent before dissolution of the additive. The anti-corrosion additive was dissolved in the resin mixture either by mixing cold or by warming to aid dissolution. A standard drier system (0.06% Co, 0.6% Pb, 0.24% Ca) was then added followed by an anti-skinning agent and, after standing overnight, the coating was applied onto degreased mild steel panels to give a uniform thickness coating. After drying at ambient temperature for seven days the panels were "cross-hatched" with a scriber and placed in a humidity cabinet to BS 3900 Part F9, 1982 conditions for 14 days. The panels were then removed, allowed to stand overnight at ambient temperature and the surface conditions of the coating noted. Half of the coating on the panel was then removed using a proprietary paint remover and the condition of the panel itself noted. The corrosion status of the stripped panel was graded as follows:

Corrosion Status:
1 = 90% + of surface corroded
10 = <1% of surface corroded

A comparative sample was included containing only the Co/Pb/Ca standard drier system. The experiment was repeated using different additives which together with the results obtained, are shown in Table 1.

The results show that the coating with only the Co/Pb/Ca drier gave a very high degree of corrosion, with a corrosion status of 1–2. All the additives listed gave some degree of anti-corrosion effect with the high molecular weight amines; tetraethylene pentamine and triethylene tetramine being particularly effective.

TABLE 1

| Anti-Corrosion Additive Corrosion | Wt % Additive based on Resin Solids. | Status. |
|---|---|---|
| None | — | 1-2** |
| Tetraethylene Pentamine* | 0.5 | 8 |
| Triethylene Tetramine* | 0.5 | 8 |
| 1.8 Diamino octane | 2 | 6 |

TABLE 1-continued

| Anti-Corrosion Additive Corrosion | Wt % Additive based on Resin Solids. | Status. |
|---|---|---|
| 1.10 Diamino decane | 2 | 4 |
| Diphenylamine | 2 | 4 |
| n-Dodecylamine* | 2 | 4 |
| Tallow dimethylamine, hydrogenated* | 2 | 4 |
| Imidazole | 2.5 | 4 |
| Imidazol acetophenone | 2 | 4 |
| 4-Nitrobenzoic acid | 1 | 4 |
| Phenoxyacetic acid | 2 | 4 |
| Tertiary butylaniline | 2 | 3 |
| High molecular weight Imidazoline* | 2 | 3 |

*Proprietary product (see separate list)
**Average of several panels

EXAMPLE 2

A pigmented coating was prepared using Synolac 77W alkyd resin as medium and R-CR2 (Proprietary product (see separate list)) titania as pigment. The amount of pigment used was sufficient to give a pigment volume concentration of 35, similar to that used in a primer composition. The anti-corrosion additive was added to the diluted resin first and dissolved either by mixing or by gentle heating. The pigment/resin medium was then ball-milled until a Hegman gauge No. 7 reading was achieved. Standard Co/Pb/Ca driers and anti-skinning agent were then added and the product further diluted to a viscosity of approximately 3 poises. After standing overnight, the formulations were applied onto degreased mild steel panels to give a uniform thickness coating, dried at ambient temperature for seven days and cross-hatched with a scriber. As the coatings were expected to be more resistant to corrosion than the unpigmented examples quoted in Example 1, the panels were tested in a salt spray apparatus using continuous salt spray for 14 days. In order to prevent rusting on the backs of the panels, these were coated with two coats of an aluminum flake paint.

For comparison with the formulations containing the soluble anti-corrosion additives, several commercially available anti-corrosion pigments were tested similarly. A portion, 20% by weight, of the titania pigment was replaced by the proprietary pigment. This method keeps the pigment volume concentration of the mixture very similar to that of titania alone, which condition is desirable for comparative testing. The pigment/resin mixture was ball-milled to Hegman gauge 7. After addition of the standard driers and anti-skinning agent and dilution to approximately 3 poises viscosity, the coatings were applied onto degreased mild steel panels, allowed to dry at ambient temperature for seven days, cross-hatched with a scriber and tested for 14 days under continuous salt spray conditions as for the soluble additives. A coating containing titania pigment only with no additives was also included for comparative purposes. Results are shown in Table 2. Under the more severe conditions used in this test, none of the coatings gave as high a corrosion status as some of those in Table 1, but the soluble anti-corrosion additives tested gave equivalent performance to that shown by zinc chromate and barium metaborate pigments.

TABLE 2

| Coating Composition | Condition of Cleaned Panel Surface after Testing | Corrosion Status |
|---|---|---|
| Resin + TiO$_2$ pigment only | Corrosion 100% of area | 1 |
| Resin + 80:20 TiO$_2$:Zinc chromate | Corrosion on cross and edges | 3 |
| Resin + 80:20 TiO$_2$:Barium metaborate* | Corrosion on cross and edges | 4 |
| Resin + 80:20 TiO$_2$:K-white* | Corrosion on cross and edges | 4 |
| Resin + 85:15 TiO$_2$: Shieldex* | Corrosion on cross, moderate on edges | 4 |
| Resin + 80:20 TiO$_2$:Zinc phosphate | Corrosion 100% of area | 1 |
| Resin + TiO$_2$ + 0.5% Tetra-ethylene pentamine | Corrosion on cross and edges | 3 |
| Resin + TiO$_2$ + 2% Diphenylamine | Slight corrosion on cross, moderate on edges | 4 |

*Proprietary products, see separate list

EXAMPLE 3

An alkyd primer paint base was prepared as follows:

| Alkyd Primer Paint Base | |
|---|---|
| Component | Parts |
| Red iron oxide pigment | 60 |
| China clay | 60 |
| Talc | 60 |
| Synolac 77W (80% resin solids) | 125 |
| White Spirit | 90–120 |
| 6% Cobalt driers | 1 |
| Anti-skinning agent | 0.2 |
| TOTAL | 411 ± 15 |

Substituted aluminum alkoxide solution was prepared as follows:

| Substituted Aluminum Alkoxide Preparation | |
|---|---|
| Component | Parts |
| Aluminum trimethoxypropoxide | 294 |
| Ethylacetoacetate | 130 |
| Methoxypropanol | −80 |
| White spirit | 80 |
| TOTAL | 424 |

This solution was prepared by slowly adding the ethylacetoacetate to the aluminum trimethoxypropoxide preheated to about 80° C. The resulting exotherm, with additional heat as necessary, raised the temperature of the preparation above the boiling point of the by-product methoxypropanol which was removed by distillation and subsequently replaced by an equal weight of white spirit.

The product had an elemental Al content of about 6.4%. An anti-corrosion additive was used consisting of:

| Component | Parts |
|---|---|
| Aluminum trimethoxypropoxide | 294 |
| Ethylacetoacetate | 130 |
| 4-Nitrobenzoic acid | 56 |

| -continued | |
|---|---|
| Component | Parts |
| Dimethylaminoethanol | 45 |
| TOTAL | 525 |

The additive was made by heating the aluminum trimethoxypropoxide in a flask fitted with a reflux condenser to about 80° C. and then slowly adding the ethylacetoacetate and removing excess heat from the exothermic reaction by condensing the by-product methoxypropanol under reflux conditions. The 4-nitrobenzoic acid was then added and dissolved and followed by the addition of the dimethylaminoethanol. Films of the paint Examples tabulated in Table 3 were applied to give approximately constant weights per unit area onto clean mild steel panels, allowed to dry in the laboratory for 14 days, and then weighed to check the thickness of the coatings applied. The panels were then "cross-hatched" with a scriber and subjected to corrosion testing by the method of BS 3900 Part F9, 1982. The condition of the panels was checked weekly by inspection. After 6 weeks the paint film was removed from half of the panel surface by the application of a proprietary paint remover. The ease of paint film removal was noted and the corrosion status of each panel recorded. The results of the above tests are also recorded in Table 3.

The results show that, compared with the panel of the Comparative Example, the panels of Examples A to F with 4-nitrobenzoic acid co-additive all show an improvement in corrosion resistance and paint film adhesion. In Examples A and B the aluminum compound in the anti-corrosion additive acted as drier in conjunction with the cobalt surface drier in the paint base without further addition of the substituted aluminum alkoxide preparation.

TABLE 3

| Coating Composition | Comparative | A | B | C | D | E | F |
|---|---|---|---|---|---|---|---|
| Primer Paint Base | 411 | 411 | 411 | 411 | 411 | 411 | 411 |
| Al alkoxide Preparation | — | 0 | 0 | 24 | 16 | 56 | 48 |
| Anti-corrosion additive | — | 19 | 38 | 9.5 | 19 | 9.5 | 19 |
| 24% Pb drier | 2.5 | — | — | — | — | — | — |
| 6% Ca drier | 4.0 | — | — | — | — | — | — |
| Dimethylaminoethanol | — | 1.6 | 0 | 2.4 | 1.6 | 2.4 | 1.6 |
| Water | — | 1 | 1 | 1 | 1 | 1 | 1 |
| Corrosion Status | 3 | 10 | 9 | 5 | 6 | 7 | 6 |
| Paint Film Adhesion | 2 | 4 | 4 | 4 | 4 | 4 | 4 |

Corrosion Status:
 1 = 90% + of surface corroded
 10 = <1% of surface corroded
Paint Film Adhesion Status:
 1 = poor adhesion; film readily removed
 5 = very strong adhesion; film very difficult to remove

EXAMPLE 4

This Example uses an aluminum trimethoxypropoxideethylacetoacetate compound as drier in conjunction with a boric oxide/dimethylaminoethanol preparation as anti-corrosion additive. A proprietary cobalt surface drier is also included. The overall acidity of the system is adjusted by addition of soluble base.

| Substituted Aluminum Alkoxide Preparation | |
|---|---|
| Component | Parts |
| Aluminum trimethoxypropoxide | 294 |
| Ethylacetoacetate | 130 |

| -continued | |
|---|---|
| Substituted Aluminum Alkoxide Preparation | |
| Component | Parts |
| TOTAL | 424 |

The solution was prepared by slowly adding the ethylacetoacetate to the aluminum trimethoxypropoxide preheated to about 80° C. The resulting exotherm, with additional heat as necessary raised the temperature of the preparation to the boiling point of the by-product methoxypropanol, in order to complete the reaction. The product had an elemental aluminum content of about 6.4%. The dimethylaminoethanol/boric oxide anti-corrosion additive was prepared as follows:

| Dimethylaminoethanol/boric oxide Preparation | |
|---|---|
| Component | Parts |
| Dimethylaminoethanol | 178 |
| Boric oxide | 70 |
| Methoxypropanol | 22 |
| TOTAL | 270 |

The dimethylaminoethanol and methoxypropanol were mixed and the boric oxide added with thorough stirring. The mixture was heated until refluxing when the boric oxide dissolved. The aluminum alkoxide compound was then added to the cooled product and mixed in.

| | Parts |
|---|---|
| Dimethylaminoethanol/boric oxide preparation | 270 |
| Aluminum alkoxide preparation | 810 |
| TOTAL | 1080 |

The product had a boron content of about 2.0% and an elemental aluminum content of about 4.8%

The boron/aluminum alkoxide preparation was used in an unpigmented alkyd resin coating in conjunction with a proprietary cobalt surface drier and anti-skinning agent. The boron/aluminum preparation was added to give approximately 1% aluminum and 0.4% boron on alkyd resin solids. In order to regulate the acidity of the system, a soluble base at 2% on resin solids was added to the diluted Synolac 177W resin prior to addition of the boron/aluminum preparation. After standing overnight at ambient temperature the coating formulations were applied to degreased mild steel panels to give a uniform thickness coating. After drying at ambient temperature for 7 days the panels were "cross-hatched" with a scriber and placed in a humidity cabinet to BS 3900 Part F9, 1982 condition for 14 days. After standing overnight at ambient temperature half of the coating on the panel was removed using a proprietary paint remover and the condition of the panel itself noted. The condition of the panel was graded for corrosion status as given in Example 1.

Table 4 shows the results for several soluble basic compounds compared with a formulation containing the boron/aluminum preparation as drier but with no base added. Although the best result was only corrosion status 3 the examples shown were all an improvement over the standard with no base added.

TABLE 4

| Composition of Base | Condition of Cleaned Panel | Corrosion Status |
|---|---|---|
| No base added | Corrosion 100% of area | 1 |
| Morpholine Tertiary | Corrosion 50% of area | 2 |
| Butylaniline | Corrosion 50% of area | 2 |
| 1:8 diaminooctane | Corrosion 50% of area | 2 |
| Octadecylamine | Corrosion 50% of area | 2 |
| High MW Imidazoline* | Corrosion 25% of area | 3 |

*Proprietary product (see separate list)

EXAMPLE 5

In this example formulations containing the soluble anti-corrosion additives were applied to aluminum panels. The soluble anti-corrosion additive was dissolved in suitably diluted Synolac 77W resin in conjunction with a cobalt/aluminum drier formulated similarly to that used in Example 3. The coatings were applied to degreased plain aluminum panels to give a uniform thickness coating, the coating allowed to dry at ambient temperature for seven days and cross-hatched with a scriber.

As corrosion rates were much slower than on steel, the coatings were tested for 14 weeks in the salt spray apparatus under conditions of continuous salt spray. After testing, the panels were allowed to stand overnight at ambient temperature, and half of the coating then removed from each panel with a proprietary paint remover. The condition of the cleaned panel was then noted in comparison with panels having coatings of resin containing only Co/Pb/Ca or Co/Zr/Ca standard driers.

Results are shown in Table 5. The substituted aluminum alkoxide preparation was added to give a 1% Al on alkyd solids concentration. With the additive tetraethylene pentamine a manganese/aluminum drier was used as well as the Co/Al drier at this gave improved drying rate.

The soluble anti-corrosion additives tested al gave considerable corrosion inhibition compared with the coatings containing only the standard Co/Pb/Ca or Co/Zr/Ca driers.

TABLE 5

| Anti-Corrosion Additive (wt % on Resin Solids) | Drier system (wt % on Resin Solids) | Corrosion Status of Cleaned Panels After Test |
|---|---|---|
| Nil | Co/Pb/Ca standard | 5 |
| Nil | Co/Zr/Ca standard | 6 |
| 0.5% Tetraethylene pentamine* | Co 0.06% Al 1% | 9 |
| 0.5% Tetraethylene pentamine* | Mn 0.06% Al 1% | 9 |

TABLE 5-continued

| Anti-Corrosion Additive (wt % on Resin Solids) | Drier system (wt % on Resin Solids) | Corrosion Status of Cleaned Panels After Test |
|---|---|---|
| 1% 4-Nitrobenzoic acid | Co 0.06% Al 1% | 10 |
| 2% 1.8 Diaminooctane | Co 0.06% Al 1% | 8 |
| 2% Phenoxyacetic acid | Co, 0.06% Al 1% | 8 |

*Proprietary product (see separate list)

EXAMPLE 6

Several of the soluble anti-corrosion additives were tested in formulations in unpigmented Synolac 77W medium and applied to copper substrates. The additive was dissolved in the suitably diluted alkyd resin by mixing or by gentle heating. To the cooled solution, standard Co/Pb/Ca driers and anti-skinning agent were added and the formulations coated onto degreased copper panels to give a uniform thickness coating. After drying for 7 days at ambient temperature, the coatings were cross-hatched with a scriber and tested in a humidity cabinet in which the atmosphere contained a strong concentration of hydrogen sulphide provided by periodic addition of solid sodium sulphide to the water in the tank. Tests showed that a degreased copper panel with no coating showed rapid blackening and corrosion under such conditions. For comparison a coating containing no soluble anti-corrosion additive was included.

After testing for 14 days, the panels were removed, allowed to stand overnight at ambient temperature, and half the coating on each panel removed with a proprietary paint remover. The condition of the cleaned panel was then compared with that of the comparative standard. Results are shown in Table 6.

The comparative standard had a rather dull surface and was given a corrosion status of 7. The coatings containing the soluble additives listed all gave brighter surfaces than the comparative standard, the tetraethylene pentamine derivatives being particularly good.

TABLE 6

| Composition of Additive | Concentration of Additive (%) | Condition of Cleaned Panel Surface after Testing | Corrosion Status |
|---|---|---|---|
| Standard - No additive | — | Rather dull surface | 7 |
| Tetraethylene* pentamine | 0.5 | Bright surface | 10 |
| Triethylene tetramine derivative* | 0.5 | Bright surface | 9 |
| | 2 | Bright surface | 9 |
| Dodecenyl-succinic anhydride | 2 | Bright surface | 9 |
| Thiadiazole* | 2 | Fairly bright surface | 8 |
| High MW Imidazoline* | 2 | Fairly bright surface | 8 |
| Morpholine | 2 | Fairly bright surface | 8 |
| 1:10 Diamino decane | 2 | Fairly bright surface | 8 |

*Proprietary additives (see separate list)

EXAMPLE 7

Several of the soluble anti-corrosion additives were tested for their effectiveness in coatings applied to magnesium substrates. The magnesium panels used had a black chromated surface which is desirable as it ensures good adhesion of the coating. As this surface can absorb moisture, the panels were dried for 30-60 minutes in an oven at 110° C. and cooled in a desiccator immediately prior to use.

The additives were dissolved in suitably diluted Synolac 77W alkyd resin as described in Example 6, and then standard Co/Pb/Ca driers and anti-skinning agent added. The resin medium was applied to the carefully dried panels to give a uniform thickness of film. After drying for seven days at ambient temperature, the coatings were cross-hatched with a scriber and subjected to continuous salt spray testing for 14 days. The coated panels were removed from the cabinet, allowed to stand overnight and the coating removed from half the panel with a proprietary paint remover. The corrosion on the cleaned half of the panel was then noted. Results are shown in Table 7. A comparative coating was included containing no dissolved additive, only the standard Co/Pb/Ca driers.

TABLE 7

| Composition of Additive | Concentration of Additive wt % on resin solids) | Condition of Cleaned Surface After Test | Corrosion Status |
|---|---|---|---|
| Co/Pb/Ca Standard | — | Corrosion 100% of surface | 1 |
| Triethylene-tetramine* | 0.25 | A few corrosion patches | 6 |
| Triethylene-tetramine* | 0.5 | A few corrosion patches | 6 |
| Tetraethylene-pentamine* | 0.25 | Several corrosion patches | 5 |
| n-Dodecylamine* | 2 | Several corrosion patches | 5 |
| Diphenylamine | 2 | Corrosion patches on cross and elsewhere | 4 |
| Tertiary Butyl-aniline | 2 | Corrosion patches on cross and elsewhere | 4 |
| Tallow dimethyl-amine* | 2 | Considerable corrosion on cross and edges | 3 |
| High MW Imidazoline* | 2 | Considerable corrosion on cross and edges | 3 |
| Dodecenyl-succinic anhydride | 2 | Considerable corrosion on cross and edges | 3 |
| 4-Nitrobenzoic acid | 1 | Considerable corrosion on cross and edges | 3 |

*Proprietary product (see separate list)

PROPRIETARY PRODUCTS AND SUPPLIES

| Chemical Constitution | Trade Name | Supplier |
|---|---|---|
| Alkyd resin | Synolac 77W | Cray Valley Products |
| Tetraethylene pentamine | TEPA | Akzo Chemie, UK |
| Triethylene tetramine | TETA | Akzo Chemie, UK |
| n-Dodecylamine | Armeen 12D | Akzo Chemie, UK |
| Tallow dimethylamine hydrogenated | Armeen DMHTD | Akzo Chemie, UK |
| High molecular weight imidazoline | Amine O | Ciba-Geigy Industrial Chemicals |
| Titania | R-CR2 | Tioxide UK Ltd. |
| Modified aluminum | K-white | Bromhead & Denison Ltd (UK agents) |
| Phosphate Modified barium metaborate | Butrol 23 | Buchman Laboratories Ltd. |
| Ion Exchange compound | Shieldex | W.R. Grace Ltd. |
| Thiadiazole | Amoco 158 | Amoco International Laboratories |

We claim:

1. A paint or varnish composition comprising an organic-based medium and an environmentally nonhazardous anticorrosion agent additive;
   wherein said anticorrosion agent additive is a compound or complex soluble per se in the medium components of the composition or solubilized by a reaction to introduce a solubilizing moiety or by prior reaction with the medium or with another component of the composition;
   said anticorrosion agent additive being selected from the group consisting of tetraethylene pentamine, triethylene tetramine, pentaethylene hexamine, diethylene triamine, 1,10-diaminodecane, 1,8-diaminooctane, dodecenyl succinic anhydride, high molecular weight imidazolines, phenozyacetic acid, nitro substituted aromatic acids, diphenylamine and t-butylaniline;
   said organic-based medium being selected from the group consisting of drying or semi-drying oils, alkyd resins, hydrocarbon resins, phenolic resins, amino resins, vinyl resins, acrylic resins, epoxy resins, saturated and oil free polyester resins, polyamide resins, polyurethane resins and chlorinated rubbers;
   wherein said paint or varnish composition is free of lead, chromium and barium;
   wherein said paint or varnish composition will dry to form a paint or varnish film on a metal substrate to which the composition is to be applied.

2. A paint or varnish composition according to claim 1, which comprises up to 10% by weight, based on medium solids, of the anticorrosion agent.

3. A paint or varnish composition according to claim 2, which comprises from 0.2 to 5% by weight, based on medium solids, of the anticorrosion agent.

4. A paint or varnish composition according to claim 1, wherein the anticorrosion agent is selected so as to enable a dry paint or varnish film to be obtained on a metal substrate within 24 hours.

5. A paint or varnish composition according to claim 4, wherein the dry paint or varnish film is obtained within 12 hours.

6. A paint or varnish composition according to claim 1, which contains at least one drier.

7. A paint or varnish composition according to claim 6, wherein the drier comprises an aluminum compound or complex.

8. A paint or varnish composition according to claim 7, wherein the anticorrosion additive is a compound or complex which is solublized by reaction with the aluminum drier.

9. A composition according to claim 1, produced by a process comprising first forming said medium followed by addition of said anti-corrosion agent to said medium.

10. A method for producing a paint or varnish composition having an organic-based medium anticorrosive, which method comprises adding to the paint or varnish medium an environmentally non-hazardous anticorrosion agent;
- wherein said anticorrosion agent is a compound or complex soluble per se in the medium components of the composition or solubilized by a reaction to introduce a solubilizing moiety or by prior reaction with the medium or with another component of the composition;
- said anticorrosion agent additive being selected from the group consisting of tetraethylene pentamine, triethylene tetramine, pentaethylene hexamine, diethylene triamine, 1,10-diaminodecane, 1,8-diaminooctane, dodecenyl succinic anhydride, high molecular weight imidazolines, phenoxyacetic acid, nitro substituted aromatic acids, diphenylamine and t-butylaniline;
- said organic-based medium being selected from the group consisting of drying or semi-drying oils, alkyd resins, hydrocarbon resins, phenolic resins, amino resins, vinyl resins, acrylic resins, epoxy resins, saturated and oil free polyester resins, polyamide resins, polyurethane resins and chlorinated rubbers;
- wherein said paint or varnish composition is free of lead, chromium and barium;
- wherein said paint or varnish composition will dry to form a paint or varnish film on a metal substrate to which the composition is to be applied.

* * * * *